United States Patent Office 3,206,390
Patented Sept. 14, 1965

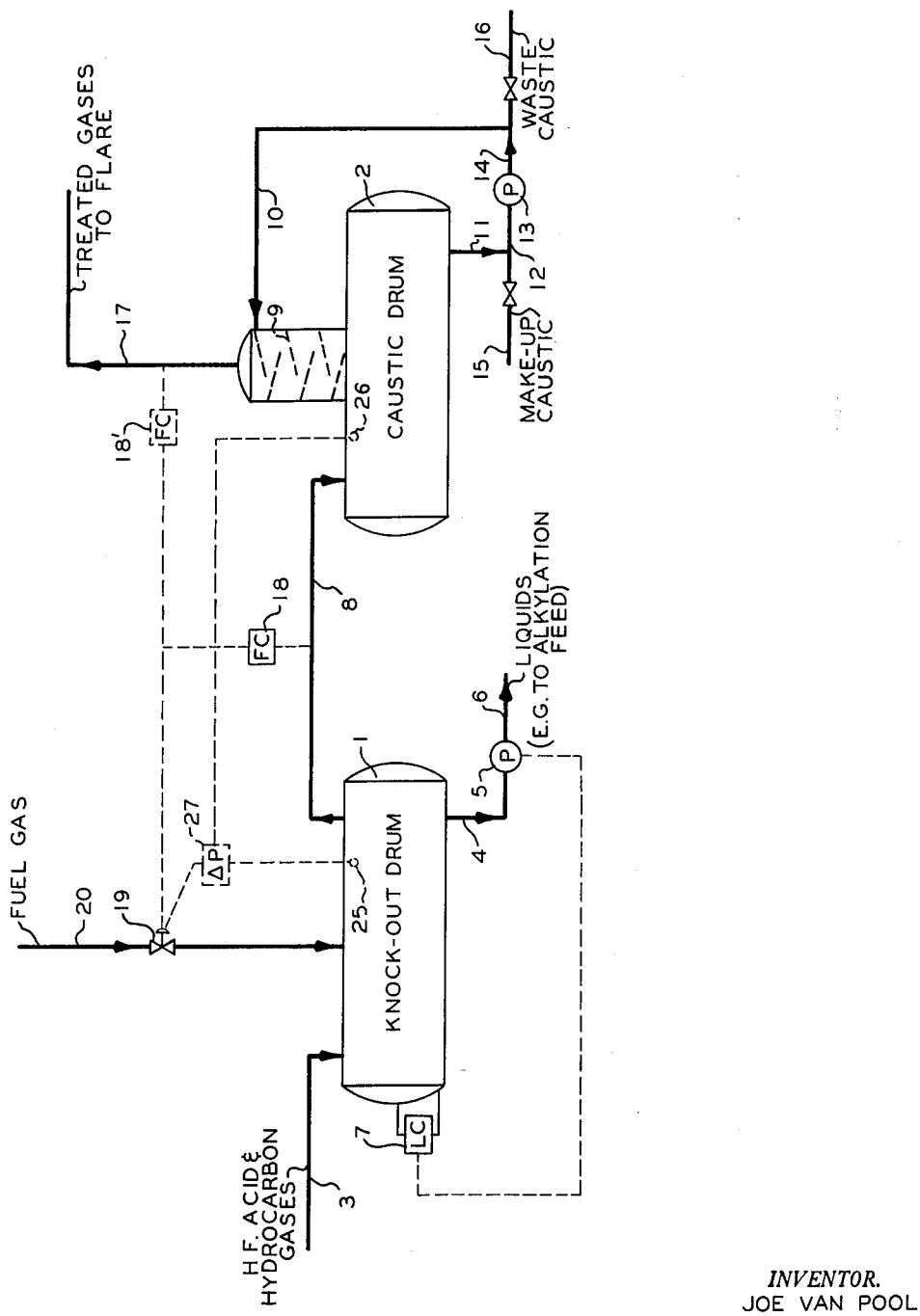

3,206,390
FLUIDS HANDLING
Joe Van Pool, Bartlesville, Okla., assignor to Phillips
Petroleum Company, a corporation of Delaware
Filed June 6, 1961, Ser. No. 126,752
8 Claims. (Cl. 208—100)

This invention relates to fluids handling. One of its aspects relates to the provision of a positive pressure in a first zone relative to the pressure in a second downstream zone by feeding a fluid to said first zone responsive to flow of fluid from said first zone to said second downstream zone. In another of its aspects the invention relates to the operation of a liquids knockout zone, to which there is fed a stream of gases or vapors containing entrained liquid to be knocked out therefrom in said zone, in conjunction with a treating zone downstream from said knockout zone, which operation comprises insuring downstream flow at all times by injecting into said knockout zone a pressuring fluid responsive to the flow from said knockout zone to said treating zone. In a further aspect of the invention it relates to the operation of a system comprising at least two zones through which it is desired to insure serial downstream flow of vapors at all times which comprises injecting a pressuring fluid into an upstream zone responsive to flow of vapors or gases through said downstream zone. In a still further aspect, the invention relates to the control of the pressure in an upstream zone from which a vapor is passed to a downstream zone, through said last zone and from said zone, treated in said last zone while therein with an agent, vapors of which are desired to be kept from migrating upstream into said upstream zone, which comprises determining in the system a flow of vapors representative of a positive pressure in said upstream zone relative to said downstream zone and maintaining a predetermined flow between said zones by introducing into said upstream zone a pressuring fluid in the quantity sufficient to maintain said flow regardless of the flow into said upstream zone of any other fluid. In a further aspect still the invention relates to an apparatus comprising at least two vessels in series, means for introducing a fluid into the first of said vessels, means for passing fluid from said first vessel into said second vessel, means for passing a fluid from said second vessel to without the system, means for injecting controllably a pressuring fluid into said first vessel, and means upon said means for passing fluid from said first vessel to said second vessel for controlling the feeding of said pressuring fluid responsive to flow in said means for passing fluid from said first vessel to said second vessel. In a still further aspect of the invention it relates to apparatus wherein the control of the feed of the pressuring fluid is effected responsive to flow from said second vessel upon said means for removing fluid from said second vessel. In a further aspect of the invention it relates to the control of a system as herein described by injecting a pressuring fluid into a first zone responsive to the pressure differential between said zone and a downstream zone in a manner to avoid reverse flow of vapors in the system.

In chemical operations in general there is frequently employed a vessel known as a knockout drum. To such a drum there will be fed a vapor or gas containing elements of a liquid which is knocked out in the drum and removed from a lower portion thereof as a liquid. Usually the liquid is used to seal the liquid removal portion of the drum against the flow of vapor through said portion. This is accomplished ordinarily by means of a liquid level which controls a pump-out means. Gases or vapors pass from such a knockout drum to a treating drum wherein the vapors may be neutralized. Thus when the vapors contain acid fumes which it is desired to neutralize the vapors may be passed to a caustic drum from the knockout drum and therein treated with a caustic solution which yields water vapor. It sometimes occurs that the water vapor backs up, as it were, into the knockout drum causing serious corrosion problems. For example, in an HF-acid alkylation plant wherein an accumulator vessel has been used as a liquid knockout zone and wherein non-condensables (hydrocarbon and hydrofluoric acid) have been charged from the knockout drum to such a caustic treater, as above mentioned, to yield substantially HF-free hydrocarbon gas to a flare where it can be burned, it has been found that water vapor backs up from the caustic drum into the knockout drum causing corrosion problems.

It has occurred to me that by maintaining at all times a sufficient flow of vapor from the knockout drum to the caustic drum I can prevent substantially completely the backing up of the water vapor into the knockout drum from the caustic drum. Further, it has occurred to me that by injecting a dry gas such as a fuel gas into the knockout drum in a quantity controlled by flow from the knockout drum to the caustic drum I can at all times maintain a sufficient pressure in the knockout drum to cause sufficient flow therefrom to the caustic drum, and this regardless of the amount of light hydrocarbons and acid flowing to the knockout drum. As will be understood by those skilled in the art of alkylation, such a knockout drum can be receiving vapors from more than one unit of operation or from more than one place in any unit of operation and accordingly the flow therethrough at times will be insufficient, if any is occurring, to prevent reverse flow of water vapor from the caustic treating drum, as above discussed. During times of shutdown it is desirable to have some automatic means whereby to prevent such reverse flow at least until suitable valves can be caused to close. It will be noted however that the use of valves against which water vapor can back up is not now a preferred form of the invention due to corrosion of the valves which may occur for reasons which will be understood by one skilled in the art having studied this disclosure.

In one embodiment of the invention a flow controller is placed on the transfer line btewveen the drums or upon a line removing gases from the caustic drum, or elsewhere, and the injection of fuel gas to the knockout drum, independently of vapors being passed thereto for knockout treatment, is controlled by such a flow controller.

It is an object of this invention to provide a method and means for fluids handling. It is a further object of this invention to provide method and means for preventing reverse flow of a vapor from a downstream treating zone into an upstream zone in which such vapors may cause damage. A further object of this invention is to provide an improved knockout drum-caustic treating means in an HF-acid alkylation operation. It is a still further object of this invention to provide in an acid-alkylation operation method and means for preventing reverse flow of water vapor from an acid neutralizing zone into a liquid knockout zone. A further object of the invention is the provision of method and means for handling a vapor from which liquids are to be knocked out following which the vapor is to be chemically treated, in such a manner as to prevent reverse flow of vapor from a treating zone in which the vapor is to be treated into the zone in which liquid is being knocked out from said vapor.

Other aspects, objects and the several advantages of this invention are apparent from a study of this disclosure, the drawing and the appended claims.

According to the present invention, which will now be described with respect to an HF-alkylation operation, there is maintained a positive pressure of a gas upon a knockout drum wherein liquids are knocked out from vapors containing hydrocarbon and acid, the flow of the gas maintaining the positive pressure being controlled responsive to flow from said knockout drum to a downstream treating vessel. In one embodiment of the invention a flow controller is placed upon the transfer line between the vessels or zones and is adjusted to control a valve in a fuel gas supply line, supplying gas to the knockout drum, in a manner such that the flow from the knockout drum through said transfer line will be sufficient to prevent reverse flow of vapors from the downstream vessel or zone to the knockout drum. In another embodiment of the invention the flow control means can be placed upon the discharge line from the treating vessel through which the vapors treated therein are removed to, say, a flare for burning purposes. Presently, the placing of the flow controller on the transfer line between the two vessels or zones is preferred. This preference is noted because it will be obvious to one skilled in the art in possession of this disclosure and having studied the same that the positive pressure in the knockout drum will be maintained regardless of what may happen in the treating zone or vessel.

Referring to the drawing which will now be described, one skilled in the art will understand that operations other than that to be desired in connection with the drawing can be effected in an operation or means substantially like that to be described. Thus, the invention is broadly applicable to other than HF-acid alkylation vapors disposal or treatment. As one skilled in the art knows there are various operations involved in petroleum refining and generally in the chemical or petrochemical arts. There are such operations which are commonly known as isomerization, polymerization, condensation, etc. Various catalysts are employed or other vapors generated which must be chemically treated prior to disposal or futher use.

In the drawing 1 and 2 are respectively a knockout drum and a caustic treating drum. HF-acid and hydrocarbon vapors enter knockout drum 1 from pipe 3. These vapors result from pressure relief valves variously placed within an HF-alkylation operation. An HF-alkylation operation is described and claimed in U.S. Patent 2,773,920, issued December 11, 1956, Lucien H. Vautrain and Edward Strunk. In said patent there are described vent gases to which this invention can be applied.

Knockout drum 1 is usually operated at or near ambient temperature and therein will be formed a liquid phase which is recovered by way of pipe 4 and returned to the system, as to the alkylation feed by pump 5 and pipe 6, the pump being controlled by liquid level controller 7. Vapors pass from drum 1 by pipe 8 into caustic drum 2 wherein the vapors are scrubbed while passing upwardly through plates 9 by a caustic solution passing downwardly over the plates, which are perforated, the solution being introduced by pipe 10. The solution is circulated from the bottom of drum 2 by pipe 12, pump 13 and pipe 14 through pipe 10. Makeup caustic can be added as desired by pipe 15. Waste caustic is periodically or continuously removed, as desired by pipe 16. Treated gases which have been neutralized are passed to a flare by pipe 17. According to the invention a flow controller 18 is operatively connected to transfer pipe 8 and to a fuel gas injection pipe control valve 19, fuel gas being introduced into knockout drum 1 by pipe 20 upon which valve 19 is operatively placed. Flow controller 18 is set to maintain a predetermined flow through pipe 8, and as will be understood by one skilled in the art fuel gas will accordingly be injected by way of pipe 19 to maintain in drum 1 a sufficient supply or pressure of fuel gas and/or hydrocarbon vapor, etc., to prevent reverse flow of water vapor from the caustic drum 2 through pipe 8 into knockout drum 1.

If desired it is within the scope of the present invention to place the flow controller upon pipe 17 in which event a flow controller 18′ controls valve 19 in pipe 20.

One skilled in the art of flow control will realize, having studied this disclosure, that a pressure controller can be used to control the flow of fuel gas through valve 19 in pipe 20. For example, pressure sensing elements 25 and 26 can signal pressures in drums 1 and 2 respectively to pressure differential controller 27 which in turn is operatively connected to valve 19, thus maintaining a positive relative pressure in drum 1 with respect to drum 2 of a magnitude such as to prevent reverse flow of the water vapor herein discussed.

The flow controller, herein discussed, can be of the pressure differential or orifice type, as known in the art.

*Specific operation*

A. When relief gas is charged:
Caustic (10), 15 Bé., circulation, g.p.m. _____ 5
Relief gas feed (3), HF plus light hydrocarbon, s.c.f./hr. _____ 600
Fuel gas (20), H₂ and methane, s.c.f./hr. _____ 0
Fuel gas yield (17), s.c.f./hr. _____ 620
Knock-out drum (1)
  Pressure, p.s.i.a. _____ 15.2
  Temperature, ° F. _____ 85
Caustic drum (2)
  Pressure, p.s.i.a. _____ 14.9
  Temperature, ° F. _____ 85
ΔP drum 1–drum 2, p.s.i. _____ 0.3

B. When no relief gas is charged:
Caustic (10), 15 Bé., circulation, g.p.m. _____ 5
Relief gas feed (3), s.c.f./hr. _____ 0
Fuel gas (20), s.c.f./hr. _____ 100
Fuel gas yield (17), s.c.f./hr. _____ 100
Knock-out drum (1)
  Pressure, p.s.i.a. _____ 15.0
  Temperature, ° F. _____ 85
Caustic drum (2)
  Pressure, p.s.i.a. _____ 14.9
  Temperature, ° F. _____ 85
ΔP drum 1–drum 2, p.s.i. _____ 0.1

In this operation, the minimum flow of gas via conduit 8 is 100 s.c.f./hr. to insure no back-up of water vapor from drum 2 into drum 1. The operation shown above illustrates (A) with relief gases charging into the system, and (B) no relief gases being charged. The flow via conduit 3 varies, but always at least 100 s.c.f./hr. of gas, in this example, flow from drum 1 into drum 2 to prevent the back-up of water vapors from drum 2 into drum 1.

If the relief gas charge is but 30 s.c.f./hr., then, of course, only 70 s.c.f./hr. of fuel gas (20) is added to drum 1, insuring thereby the 100 s.c.f./hr. minimum vapor flow from drum 1 into drum 2.

Reasonable variation and modification are possible within the scope of the foregoing disclosure, the drawing and the appended claims to the invention, the essence of which is that reverse flow of vapors, as described, is avoided by maintaining at all times responsive to the flow and/or pressure drop between two zones, a flow of pressuring fluid into the first of said zones, substantially as here set forth and described.

I claim:

1. In an HF-alkylation operation wherein there are obtained in a stream vaporous light hydrocarbons and HF-acid those steps in combination which consist essentially of feeding only said vaporous stream to a liquid knockout zone, in said zone removing liquid from said stream, passing the remainder of said stream containing hydrocarbons to a neutralizing zone, said knockout and said neutralizing zones being maintained continuously in open vapor communication with each other, therein treating said stream with an aqueous neutralizing solution, and also feeding into said liquid knockout zone a dry fuel gas in a quantity sufficient to maintain between said zones a predetermined desired flow of vaporous hydrocarbons whereby to prevent backflow of water vapor by way of said continuously open vapor communication from the neutralizing zone into the liquid knockout zone.

2. The operation of claim 1 wherein the aqueous neutralizing solution is caustic alkali.

3. An apparatus consisting essentially only of a first vessel and a second vessel, means to pass a fluid into said first vessel, means to remove a liquid from said first vessel, mean to remove a vapor from said first vessel, means to pass said removed vapor to said second vessel, said first and said second vessels being in continuous unobstructed open vapor communication with each other, by way of an open conduit, means to remove a treated vapor from said second vessel, means connected to said second vessel to introduce thereinto a treating agent, controlled means on said first vessel to controllably introduce a pressuring fluid into said first vessel, and means responsive to the flow of vapors between said vessels to control said controlled means.

4. An apparatus consisting essentially only of a first vessel and a second vessel, means to pass a fluid into said first vessel, means to remove a liquid from said first vessel, means to remove a vapor from said first vessel, means to pass said removed vapor to said second vessel, said first and said second vessels being in continuous unobstructed open vapor communication with each other, means to remove a treated vapor from said second vessel, means connected to said second vessel to introduce thereinto a treating agent, controlled means on said first vessel to controllably introduce a pressuring fluid into said first vessel, and means responsive to the differential of pressure between said vessels to control said controlled means.

5. The operation of claim 1 wherein the dry fuel gas is fed to the liquid knockout zone responsive to rate of said vaporous flow of hydrocarbons between said zones.

6. The operation of claim 1 wherein the dry fuel gas is fed to the liquid knockout zone responsive to the pressure differential of the fluid in said zones, the said pressure differential being a predetermined pressure differential at which backflow by way of said continuously open vapor communication of water vapor does not occur.

7. An apparatus according to claim 3 wherein the means responsive to the flow of vapors between said vessels is operatively connected to said means to pass said removed vapors to said second vessel.

8. An apparatus according to claim 4 wherein the means responsive to the differential of pressure between said vessels is a pressure differential controller operatively connected to said vessel to sense the respective pressures of said vessels and to transmit a signal representative of said pressure differential to said controlled means.

References Cited by the Examiner

UNITED STATES PATENTS

| | | | |
|---|---|---|---|
| 2,277,387 | 3/42 | Carney | 183—114.5 XR |
| 2,398,496 | 4/46 | Edmister et al. | 208—102 XR |
| 2,504,464 | 4/50 | Stanley | 196—132 |
| 2,615,928 | 10/52 | Jolly | 260—683.41 |
| 2,697,685 | 12/54 | Fahnestock et al. | 208—174 |
| 2,705,216 | 3/55 | Drew | 208—174 |
| 2,757,067 | 7/56 | Cornell et al. | 196—132 |
| 2,770,584 | 11/56 | Ray et al. | 208—174 |
| 2,890,156 | 6/59 | Vautrian | 196—132 |
| 2,893,845 | 7/59 | Erickson | 196—132 |
| 2,905,627 | 9/59 | Lee et al. | 208—103 |
| 2,934,491 | 4/60 | Palmer | 196—100 XR |
| 2,978,063 | 4/61 | Ford et al. | 55—160 |

ALPHONSO D. SULLIVAN, *Primary Examiner.*